Sept. 4, 1951            H. G. WENZ            2,567,139
STAR CLOCK
Filed Nov. 12, 1947
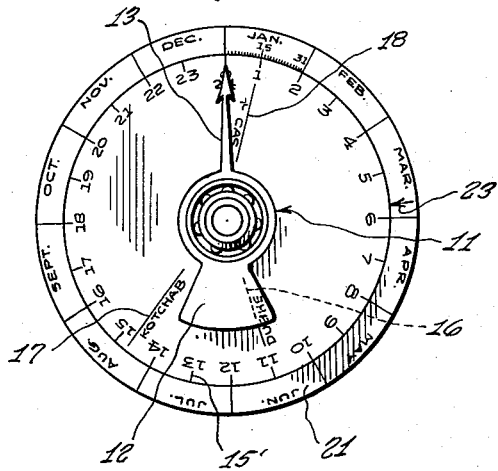
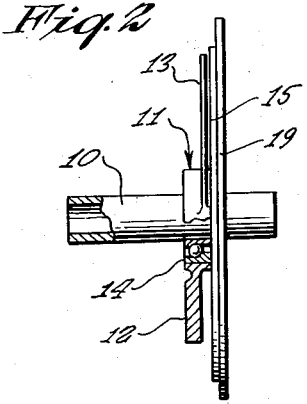
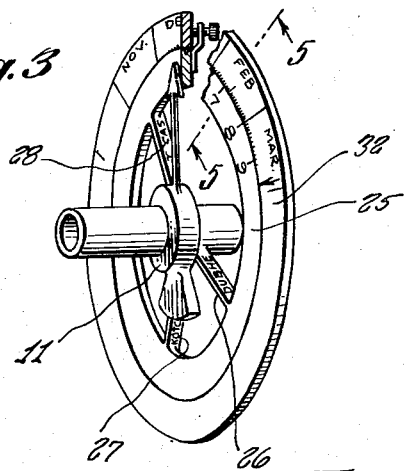
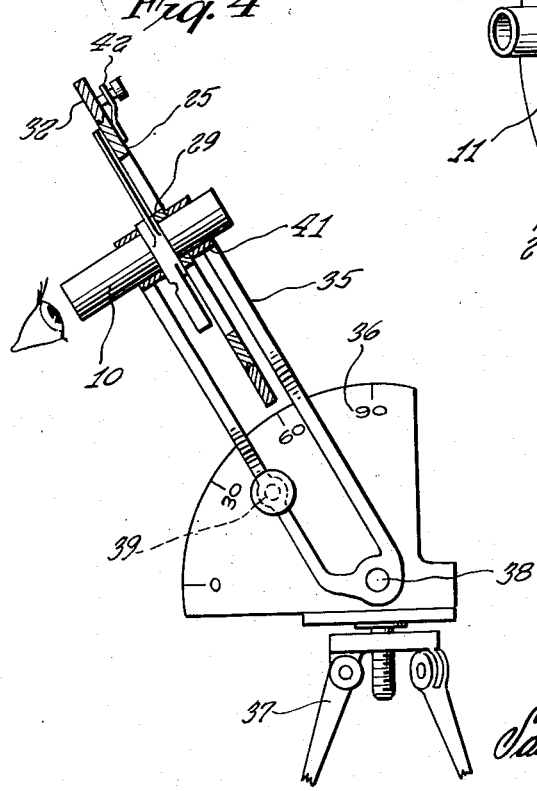
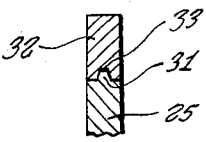
INVENTOR.
HARRY G. WENZ
BY
Saulsbury, Russell & Squire
ATTORNEYS Patented Sept. 4, 1951

2,567,139

UNITED STATES PATENT OFFICE 2,567,139

STAR CLOCK

Harry G. Wenz, Bronx, N. Y.

Application November 12, 1947, Serial No. 785,345

2 Claims. (Cl. 35—44)

This invention relates to a star clock.

It is an object of the present invention to provide a device whereby the time of night may be taken from the stars by an amateur with little effort, without computations and by merely pointing and sighting the device upon the star Polaris, adjusting a radial line upon a certain circumpolar star of known right ascension, taking a reading and then with means on the device converting the reading, which was indicative of sidereal time, into mean solar time.

It is another object of the invention to provide a star clock adapted to be used in the nighttime to indicate the hour and minutes thereof wherein there is provided means in the form of a weighted pointer to mark automatically the zenith and wherein its pointed arm is available for making a reading upon adjacent scales and wherein the weighted point is operable with the same effect regardless of the angle to which the device has been pointed.

Other objects of the present invention are to provide a star clock device which is of simple construction, adapted for use by amateurs, inexpensive to manufacture and efficient in operation.

For other objects and for a better understanding of the invention, reference may be had to the description taken in connection with the accompanying drawing, in which Fig. 1 is a front elevational view of my star clock device.

Fig. 2 is a side elevational view of the device with portions broken away to show interior portions thereof.

Fig. 3 is a perspective view of a modified form of the device.

Fig. 4 is a longitudinal sectional view of the device and of a support forming a part of a tripod on which the device of Fig. 3 can be mounted when in use and particularly when the device is to be used for solving navigation problems.

Fig. 5 is a fragmentary and sectional view taken on line 5—5 of Fig. 3 and illustrating the manner in which the outer ring is retained on the inner member.

Referring now to the figures, 10 represents a sighting tube which is held to the eye for the purpose of sighting the star Polaris. Supported upon the tube 10 intermediate its length thereof and for free rotation is a weighted pointer 11 including a weight portion 12 and a pointer arm 13. In order to insure free rotation of the weighted pointer on the sleeve, the connection with the sleeve is effected through a ball bearing element 14 whereby the pointer will be effective whether device is extended horizontally or to an inclination thereof. Fixed to the tube 10, Figs. 1 and 2, is a transparent disc 15 which has its periphery graduated to indicate 24 hour divisions, indicated at 15'. Each hour division may be subdivided into fractions of the hour, the magnitude of the subdivisions depending upon the degree of accuracy that is desired. Also on the disc 15 are three radial lines indicated at 16, 17 and 18 and extending from the center of the disc to the periphery, each line correctly positioned to correspond to the right ascension of the particular circumpolar star which is named on the disc. For example, the line 16 marked Dubhe terminates at the 11-hour division of the scale which is that particular star's right ascension as shown on a star map. Any other circumpolar star could be chosen provided its right ascension be correctly positioned on the disc.

Immediately behind the disc 15 and free to rotate about the tube 10, is a disc or member of greater diameter than the disc 15 and as indicated at 19 in order to provide for a second circular scale 21 with graduations adapted to be registered with the hour divisions on the disc 15. This outer scale is graduated in months and days of the year and is utilized to effect the conversion of the sidereal time as indicated by the pointer arm 13 on the hour division scale, to mean solar time with one simple adjustment or setting.

To use the device, the tube 10 is elevated to bear upon the star Polaris whereby it will be viewed by the observer through the tube opening, the device having been raised to the eye level. Automatically the weighted pointer will adjust itself on the tube so that its arm 13 is displaced from the zenith by an angle equal to the latitude. Slowly the tube is rotated with the disc 15 so that one of the radial right ascension lines coincides with the particular star with which notation is to be made. The pointer arm 13 having come to rest will indicate on the disc 15 the instantaneous sidereal time. With the thumb and finger, the pointer arm 13 can be held against the disc 15 to retain the indication while the device is removed from its sighting position and the disc 19 rotated so that the date division thereon coincides with the pointer arm 13. Opposite an arrow indication 23 on the scale 19 and upon the hour scale of the disc 15, the correct mean solar time will be read. The arrow referred to indicates the first point of Aries and occurs approximately on the 23rd day of March.

In order to overcome the loss of transparency occasioned by two discs arranged over one another, an alternative or modified construction is provided as shown in Figs. 3, 4 and 5. The same weighted pointer or member 11 is used but instead of the central member being in the form of a disc, it is made in the form of a ring 25 with spokes 26, 27 and 28 attached to a hub 29 which is fixed to the tube 10. The spokes are arranged at angles corresponding to the lines 16, 17 and 18 of the disc 15 and are utilized for notation upon the circumpolar stars of known right ascension. On the ring 25 there are the same hour and minute division marks.

The ring 25 has a bead 31 on its outer periphery for retaining a circular ring 32 having a cooperating groove in its inner periphery as indicated at 33 for receiving the bead 31. The ring 32 is adjustable on the member 25. The operation of the device is the same as that described above.

If the device is to be used for determining latitude, the same may be mounted on an arm 35 which is adjustable over a quadrant 36 fixed upon a tripod support 37. The arm 35 is pivoted on the quadrant as indicated at 38 and can be fixed to the quadrant in its adjusted position by a turn screw 39. The arm 35 is provided with a sleeve portion 41 for receiving the tube 10. With the device on the arm 35 and leveled, the latitude reading may be taken from the quadrant. This device, however, is limited in its use to the determination of latitudes north of the equator.

Since the device indicates instantaneous sidereal time, and having the Greenwich Civil Time, as determined from a chronometer, the longitude can be obtained by reference to a nautical almanac. The ring 32 is retained in place by a lug 42 on ring 25 and a set screw 43.

Inasmuch as star maps are plotted in sidereal time, this device will facilitate the location of stars and constellations.

The device as shown, does not take into consideration the incidence of a leap year. This may be done by adding one additional division on the scale of month and days but it seems unnecessary when taking into consideration unavoidable errors of observation and manipulation which are present with the use of any such devices.

It will be apparent that the sighting tube 10 can be replaced by a low-power telescope if more accuracy is desired. This device can be made as a small inexpensive and portable device or may be enlarged upon and perfected for use where more accuracy is desired.

While a single star of known right ascension would serve to determine time, calibration for three stars of widely separated angles is recommended for convenience and to insure that at least one of the three stars will be in a position for good observation.

While various changes may be made in the detail construction, it shall be understood that such changes shall be within the spirit and scope of the present invention as defined by the appended claims.

I claim:

1. A star clock comprising a sighting tube, a weighted pointer mounted on the sighting tube for free rotation, a member comprising a ring portion, a hub portion fixed to the tube and spoke portions extending at radial directions and angularly spaced about the hub portion to correspond respectively to the right ascensions of particular circumpolar stars and by which notation may be made of these respective stars upon the tube being sighted upon Polaris, said ring portion having a scale to indicate the sidereal time when referred to by the weighted pointer, and an external ring having a bead and groove connection on the ring portion of the one member in order that it may be adjusted about the member, said ring having month indications thereon and a mark indicating in the month of March the first point of Aries, and the markings on both rings being directly visible to a user during manipulation of the device.

2. A star clock device comprising an axial sighting tube, a weighted pointer journalled for free rotation on said tube, an annular ring fixed to the tube by radial spokes respectively designated and disposed to correspond to the right ascension of predetermined circumpolar stars with which the device is to be aligned when put into use, the face of said annular ring being graduated in hour divisions of one day in a complete circle whereby the pointer will indicate sidereal time when the tube is sighted on Polaris, a second annular ring fitted on the first annular ring and slidably adjustable on the first annular ring, the face of said second annular ring being graduated with the months and days of a year in a complete circle, and being movable to align the date with the pointer, and an indicating mark corresponding to the first point of Aries on said second graduated ring and serving to convert the sidereal time indicated by the pointer on the hour scale, to mean solar time.

HARRY G. WENZ.

REFERENCES CITED

The following references are of record in the file of this patent:

UNITED STATES PATENTS

| Number | Name | Date |
| --- | --- | --- |
| 1,383,296 | Giot | July 5, 1921 |
| 1,620,980 | Meacham | Mar. 15, 1927 |
| 1,763,827 | Stephen | June 17, 1930 |
| 2,006,075 | Lofgren | June 25, 1935 |
| 2,303,967 | Weiner | Dec. 1, 1942 |
| 2,489,003 | Blair | Nov. 22, 1949 |